United States Patent [19]

Gegaregian et al.

[11] 4,438,866

[45] Mar. 27, 1984

[54] PRESTRESSED DOME CLOSURE FLANGE

[75] Inventors: Albert A. Gegaregian, Sunnyvale; Dennis K. Kuruma, Milpitas; Kenneth W. Lengel, Sunnyvale, all of Calif.

[73] Assignee: Westinghouse Electric Corp., Pittsburgh, Pa.

[21] Appl. No.: 404,672

[22] Filed: Aug. 3, 1982

[51] Int. Cl.³ .................. B65D 45/02; B65D 45/30
[52] U.S. Cl. .................................. 220/319; 220/3; 220/327; 220/378; 292/256.6
[58] Field of Search ............... 220/3, 327, 328, 252, 220/319, 323, 324, 200, 315, 378; 292/256.61, 292/256, 256.71, 256.73, 256.75, 256.6; 52/80, 224

[56] References Cited

U.S. PATENT DOCUMENTS

| | | | |
|---|---|---|---|
| 1,700,670 | 1/1929 | De Francisci | 292/256.61 X |
| 2,223,318 | 11/1940 | Gibb | 292/256.71 X |
| 2,294,636 | 9/1942 | Stearns | 292/256.73 X |
| 2,301,113 | 11/1942 | Ettington et al. | 292/256.71 |
| 2,420,411 | 5/1947 | Blout, Sr. | 292/256.71 X |
| 2,729,491 | 1/1956 | Sieder | 292/256.6 |
| 4,063,831 | 12/1977 | Meuret | 220/327 X |
| 4,157,146 | 6/1979 | Svenson | 292/257 X |
| 4,240,561 | 12/1980 | Hagstrom et al. | 292/256.71 X |

FOREIGN PATENT DOCUMENTS 1218459  5/1960  France .......................... 292/256.6

Primary Examiner—Allan N. Shoap
Attorney, Agent, or Firm—F. J. Baehr, Jr.

[57]  ABSTRACT

An integral flange for a composite dome closure wherein the flange has a lip on its lower outer periphery about which the flange rotates when a clamping force is applied to prestress the dome closure adjacent the flange to minimize the stresses in this area of the dome under normal internal pressurization of the dome closure.

10 Claims, 6 Drawing Figures

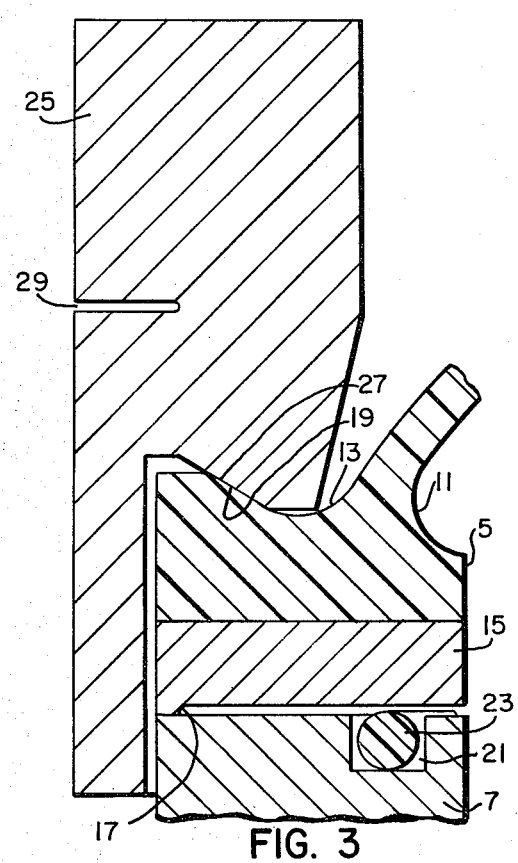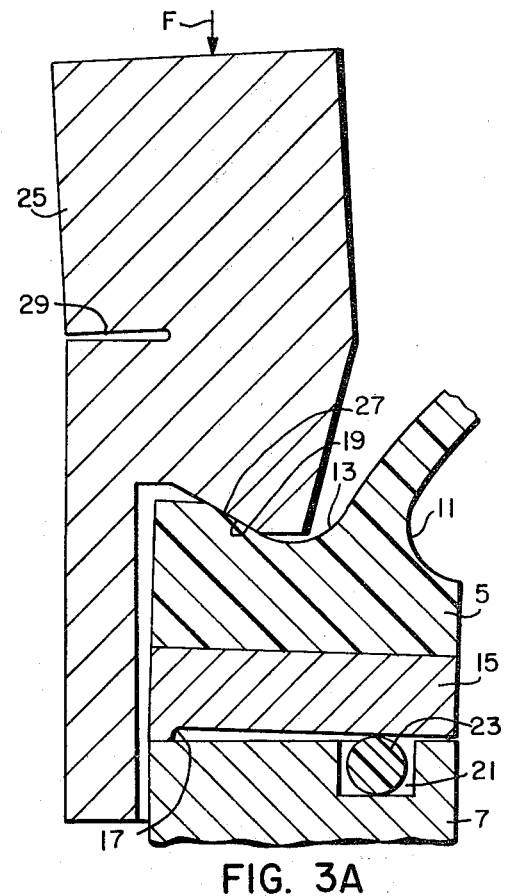
FIG. 3          FIG. 3A
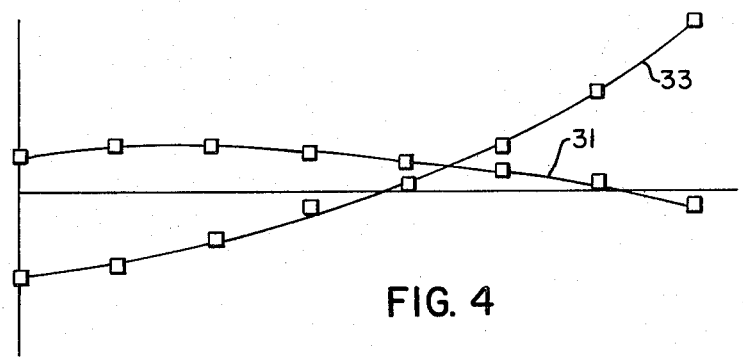
FIG. 4

PRESTRESSED DOME CLOSURE FLANGE

GOVERNMENT CONTRACT

The U.S. Government has rights in this invention pursuant to the terms of contract number N00030-79-C-0162 awarded by the Department of Defense.

BACKGROUND OF THE INVENTION

This invention relates to composite domed closures and more particularly to a flange which prestresses the dome closure to increase the load capacity thereof.

Asbestos reinforced phenolic resin composite domes provide adequate strength but asbestos is a known carcinogen and its use is being phased out. Substitute composite materials with other required properties have less strength so to utilize new composites in basic proven designs minimum structural changes in the flange were made in order to prestress the dome adjacent the flange to provide acceptable stress levels in that portion of the dome.

SUMMARY OF THE INVENTION

In general a flange for prestressing inner and outer fibers of a dome closure adjacent the flange comprises a ring made integral with the dome closure and extending radially outwardly therefrom, an annular riser disposed adjacent the outer periphery of the ring. The ring has a surface outboard of the dome closure for receiving a clamping force which rotates the ring about the annular rise producing compressive forces in the outer fibers in the dome adjacent the ring and tensile forces in the inner fiber of the dome adjacent the ring thereby reducing the forces in the fibers adjacent the ring when the dome closure is pressurized.

BRIEF DESCRIPTION OF THE DRAWINGS

The object and advantages of this invention will become more apparent from reading the following detailed description in conjunction with the accopanying drawings, in which:

FIG. 3 is an enlarged partial sectional view similar to FIG. 2 but showing a modification thereof;

FIG. 3A is an enlarged partial sectional view similar to FIG. 2A but showing a modification thereof;

FIG. 4 is a graph showing inner and outer fiber stresses versus internal pressure within the dome.

DESCRIPTION OF THE PREFERRED EMBODIMENTS

Figure 1:
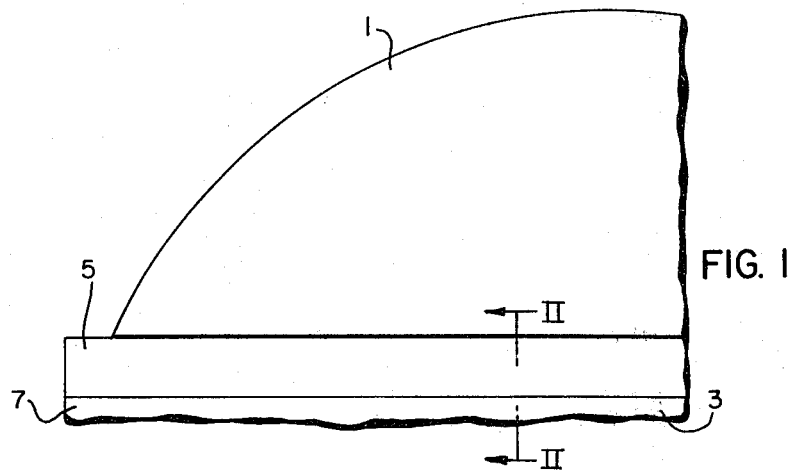
FIG. 1 is a partial elevational view of a flanged dome made in accordance with this invention.

Referring now to the drawings in detail and in particular to FIG. 1 there is shown a dome closure for a vessel 3. The dome closure 1 is connected to the vessel 3 by a pair of flanges 5 and 7, respectively.

Figure 2:
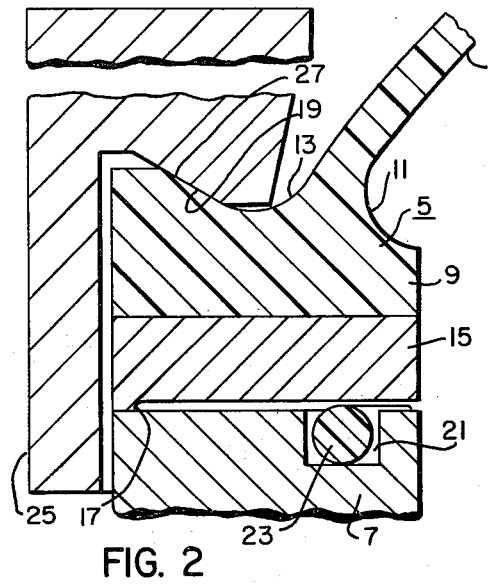
FIG. 2 is an enlarged partial sectional view taken on line II—II of FIG. 1 prior to applying a clamping force.
Figure 2A:
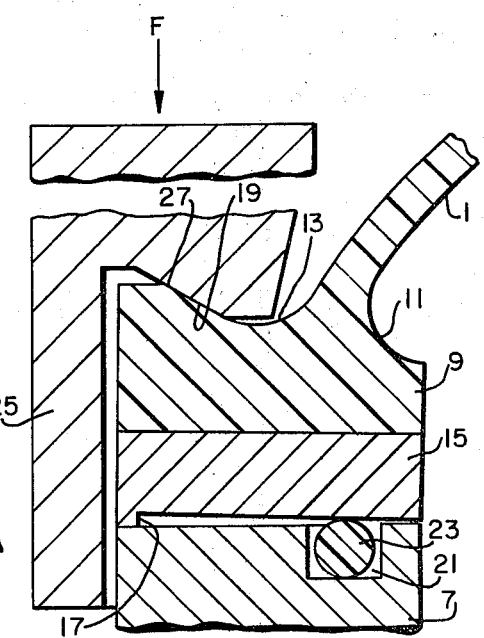
FIG. 2A is an enlarged partial sectional view taken on line II—II of FIG. 1 after applying a clamping force.

The dome closure 1 and flange 5, as shown in FIGS. 2 and 2A are formed from a composite material. The flange 5 comprises a ring 9 extending radially inwardly and outwardly from the dome closure 1 and the juncture therebetween has a relatively large radii 11 and 13 on both the inner and outer side of the dome closure 1. Bonded to the underside of the ring 9 is an annular plate 15 with a rise or lip 17 disposed adjacent the outer periphery. The flange 5 also has an upper surface 19 disposed to receive a clamping force F to rotate the flange 5 about the lip 17 and to seal the flanges 5 and 7. The flange 7 has a circumferential groove 21 on an interface surface between the flanges 5 and 7 the groove 21 is adapted to receive an O-ring 23 which forms the seal between the flanges 5 and 7 when the clamping force F is applied. While the preferred embodiment shows the lip 17 on the flange 5 it could also be placed on the flange 7.

As shown in FIGS. 3 and 3A a thick sleeve 25 is disposed over the flanges 5 and 7 and has a counterbore with an annular surface 27 that registers with the surface 19 on the flange 5, which receives the clamping force F. The clamping force F is applied to the sleeve 25 and transmitted to the flange 5 via the surface 19 and 27. The sleeve 25 has a radial groove 29 extending inwardly from its outer surface. The groove 29 tends to redirect the clamping force F which is applied to the sleeve 25, radially inwardly which provides a greater rotation of the flange 5.

The rotation of the flange 5 results in compressive stresses or forces being produced in the outer fiber or the fibers adjacent the outer surface or convex surface of the dome closure 1 and adjacent the flange 5 and tensile stresses or forces being applied to the inner fibers or the fibers adjacent the inner surface or the concave surface of the dome closure 1 and adjacent the flange 5.

FIG. 4 shows two curves of fiber stress versus pressure within the dome closure. Curve 31 represents inner fiber stress and curve 33 represents outer fiber stress. The prestressing of the dome adjacent the flange by applying a clamping force to the flange 5 reduces the stress in the inner and outer fibers as pressure is initially increased inside the dome closure 1.

The composite flange 5 and dome closure 1 advantageously prestress the dome closure 1 adjacent the flange 5 to reduce the stress in the dome adjacent the flange during normal pressurization of the vessel.

What is claimed is:

1. A flange for prestressing the fibers adjacent inner and outer surfaces of a dome closure and adjacent said flange, comprising:
   a ring made integral with said dome closure and extending radially outwardly thereof;
   an annular rise disposed adjacent the outer periphery of said ring; and
   said ring having a surface outboard of said dome closure for receiving a clamping force, which rotates said ring about said annular rise producing compressive forces in said fibers adjacent the outer surface of said dome closure and adjacent said ring and tensile forces in said fibers adjacent the inner surface of said dome closure and adjacent said ring thereby reducing the forces in said fibers adjacent said ring when the dome closure is internally pressurized.

2. A flange as set forth in claim 1, wherein the dome closure and ring are made of a composite material.

3. A flange as set forth in claim 2 and further comprising an annular plate bonded to the under side of the ring.

4. A flange as set forth in claim 3, wherein the annular plate has an annular rise disposed on the outer periphery thereof.

5. A flange as set forth in claim 4, wherein the annular plate is metallic.

6. A flange as set forth in claim 1 and further comprising a thick sleeve having a counterbore which fits over said ring and a surface which engages said surface on said ring which receives the clamping force.

7. A flange as set forth in claim 6, wherein said sleeve has a circumferential groove extending inwardly from an outer surface of said sleeve, which redirects the clamping force which is applied to said sleeve whereby said clamping force provides greater rotation of said ring.

8. A flange as set forth in claim 1, wherein the ring also extends radially inwardly from the dome closure.

9. A flange as set forth in claim 8, wherein the juncture of the ring and closure has a large inner and outer radius.

10. A flange as set forth in claim 9, wherein the ring is thickest at its radially outward periphery.

* * * * *